(12) United States Patent
Narayan et al.

(10) Patent No.: US 12,073,484 B2
(45) Date of Patent: Aug. 27, 2024

(54) SYSTEM FOR TRANSPORTING A VULNERABLE POPULATION TO A DESIRED DESTINATION BY ONE OR MORE DRIVERS IN A SET OF TRUSTED DRIVERS

(71) Applicant: Zum Services, Inc., Redwood City, CA (US)

(72) Inventors: Ritu Narayan, San Carlos, CA (US); Vivek Garg, San Mateo, CA (US); Abhishek Garg, Cambridge, MA (US)

(73) Assignee: Zum Services, Inc., Redwood City, CA (US)

( * ) Notice: Subject to any disclaimer, the term of this patent is extended or adjusted under 35 U.S.C. 154(b) by 0 days.

(21) Appl. No.: 17/333,444

(22) Filed: May 28, 2021

(65) Prior Publication Data

US 2022/0012836 A1    Jan. 13, 2022

Related U.S. Application Data

(63) Continuation of application No. 15/411,826, filed on Jan. 20, 2017, now Pat. No. 11,023,991.

(51) Int. Cl.
*G06Q 50/40* (2024.01)
*G06Q 10/0631* (2023.01)
*G06Q 10/109* (2023.01)
*G06Q 50/00* (2024.01)
*H04L 51/52* (2022.01)

(52) U.S. Cl.
CPC ..... *G06Q 50/40* (2024.01); *G06Q 10/063116* (2013.01); *G06Q 10/109* (2013.01); *G06Q 50/01* (2013.01); *H04L 51/52* (2022.05)

(58) Field of Classification Search
CPC .......... G06Q 50/30; G06Q 10/063116; G06Q 10/109; G06Q 50/01; H04L 51/52
USPC ....................................................... 705/7.16
See application file for complete search history.

(56) References Cited

U.S. PATENT DOCUMENTS

| 10,325,228 | B2 | 6/2019 | Khan | |
|---|---|---|---|---|
| 10,972,884 | B2 | 4/2021 | Khan | |
| 2005/0114014 | A1* | 5/2005 | Isaac | G01C 21/26 701/465 |
| 2008/0270019 | A1* | 10/2008 | Anderson | G06Q 50/40 705/1.1 |

(Continued)

OTHER PUBLICATIONS

Jamal Yousaf, Juanzi Li, A Driver and Riders Matching Approach, Department of, Computer Science and Technology, Tsinghua National Laboratory for Information Science and Technology, Tsinghua University, Beijing, 100084, (Year: 2014).*

(Continued)

*Primary Examiner* — Abdallah A El-Hage Hassan
(74) *Attorney, Agent, or Firm* — Kilpatrick Townsend & Stockton LLP

(57) ABSTRACT

This disclosure generally relates to a method and system for scheduling a ride for a third party by a ride requestor. In one embodiment, the method includes receiving a ride request for a third party rider from a user device. The method may further include identifying a set of drivers from a trusted drivers and identifying from the set of trusted drivers, an optimal driver. The method may further include transmitting a ride confirmation to the ride requestor, the optimal driver, and the third party rider.

20 Claims, 6 Drawing Sheets

(56) References Cited

U.S. PATENT DOCUMENTS

| | | | |
|---|---|---|---|
| 2009/0083111 A1* | 3/2009 | Carr | G06Q 10/06 |
| | | | 705/329 |
| 2015/0163412 A1* | 6/2015 | Holley | H05B 47/19 |
| | | | 348/143 |
| 2015/0248689 A1* | 9/2015 | Paul | G06Q 30/0222 |
| | | | 705/14.23 |
| 2016/0318521 A1* | 11/2016 | Nothacker | A61B 5/082 |
| 2017/0124506 A1* | 5/2017 | Khan | G06Q 30/0282 |
| 2017/0127215 A1* | 5/2017 | Khan | G08G 1/202 |

OTHER PUBLICATIONS

H. A. N. C. Bandara*, Dileeka Dias**, A Multi-Agent System for Dynamic Ride Sharing, Faculty of Information Technology, University of Moratuwa, Sri Lanka Fourth International Conference on Industrial and Information Systems, ICIIS 2009, Dec. 28-31, 2009, Sri Lan (Year: 2009).*

* cited by examiner

SYSTEM FOR TRANSPORTING A VULNERABLE POPULATION TO A DESIRED DESTINATION BY ONE OR MORE DRIVERS IN A SET OF TRUSTED DRIVERS

CROSS-REFERENCE TO RELATED APPLICATIONS

This application is a continuation of U.S. patent application Ser. No. 15/411,826, filed Jan. 20, 2017, (now U.S. Pat. No. 11,023,991, issued on Jun. 1, 2021) entitled "A SYSTEM FOR TRANSPORTING A VULNERABLE POPULATION TO A DESIRED DESTINATION BY ONE OR MORE DRIVERS IN A SET OF TRUSTED DRIVERS," which is hereby incorporated by reference herein in its entirety, including but not limited to those portions that specifically appear hereinafter, the incorporation by reference being made with the following exception: In the event that any portion of the above-referenced application is inconsistent with this application, this application supersedes said portion of said above-referenced application.

BACKGROUND

1. Technical Field

This disclosure relates to a system for transporting a specific type of passenger. More specifically, the present system enables a certain category of the population, who are more vulnerable than reasonable adults, to be transported to the vulnerable population's desired destination by a set of specially qualified drivers known as trusted drivers. This disclosure further relates to a method for scheduling a ride for a third party by a ride requester, receiving, from a user device associated with a ride requester, a ride request for a third party rider; identifying a set of trusted drivers from a set of drivers; identifying, from among the set of trusted drivers, an optimal driver; and transmitting a ride confirmation to the ride requester, the optimal driver, and the third party rider.

2. Description of the Related Art

In the ever-changing and face paced nature of the world today, the demand for transportation is at an all-time high. That is, transportation that is accessible, immediate, curbside, readily available, and easy to solicit, is desirable. Moreover, the demand for the technology that corresponds to such type of transportation is in high demand. Conventional driving service providers who though they may possibly be vetted by traditional background checks, drug screening, and possibly other qualifying attributes, are not uniquely selected as a set of specially trained and trusted drivers just for those more vulnerable or dependent on caretakers or guardians, or of diminished capacity. Put another way, a certain segment of the population may be considered dependent or more vulnerable than the average population. This vulnerable population includes very young children, who require a guardian, caretaker or parent and are not safely or easily able to themselves access transportation. Similarly, certain elderly persons may be considered as part of this group.

This vulnerable population may require high supervision. Exemplary members of this population may suffer from dementia, loss of capacity, or perhaps even have greater need for physical assistance. Further, elderly individuals may not understand new or complex technology and may, therefore, struggle using a mobile phone or other modern devices. Consequently, a need for simple understandable technology exists, especially when it comes to requesting and soliciting transportation services.

Other exemplary members of this unique population may experience diminished capacity by virtue of a learning, emotional, physical, or other disability leaving many of these members of this unique population dependent on a caretaker or guardian. These people may require, for example, sign-in and sign-out of school, or someone check their decision making to ensure their decisions are sound. Even adolescents or teens may fall in this category for various reasons. Collectively, this unique, dependent, assistance-requiring population is referred to herein as third party riders. Third party riders may be in need of transportation services for which they lack the capacity or ability to request and evaluate on their own.

In sum, these third party riders require more care, a higher degree of safety, and heightened level of screening and security for service providers. In many cases, third party riders are not able to book their own travel, and in many cases lack the adequate mental or physical capacity and understanding to schedule or request a ride.

Conventional ride provisioning solutions are not specifically designed to identify a uniquely qualified driver in whom the guardian or caretaker may have has high trust, confidence; or with whom safety concerns are minimal. In other words, conventional technology serves competent and experienced individuals who have the judgement to be transported in the same way that bus drivers, taxi drivers and other entities transport people. For example, conventional users of mass transportation must be of adequate mental and/or physical capacity to know where to meet a bus, how to solicit and pay a taxi, or how to use a mobile device to order a ride and sufficiently ensure that the destination is made known to the driver. Accordingly, because a person with reduced judgement has unique needs to ensure he or she is not abused by those with more advanced decision making skills or non-altruistic motives, these conventional solutions are inadequate to serve these third party riders.

For instance, when a child needs safe transportation, a parent may be justifiably concerned with a driver harming the child, getting in an accident, saying or doing inappropriate things to the child, or even the unimaginable, kidnapping the child. Similarly, when an elderly person needs a ride, a caretaker for the elderly person may be justifiably concerned about the elderly person's safety or their ability to communicate effectively enough to express their desired destination. In both examples, conventional solutions are inadequate to address concerns for a child and an elderly person who may not have the capacity, judgment, or life experience to properly evaluate people and potential dangers and exercise sufficient decision making.

Conventional transportation solutions fail to meet other needs of third party riders. In one example, a driver may be required to walk into a school and sign-in/sign-out the third party rider. Alternatively, perhaps the third party rider may need a ride to an activity and requires the driver to remain with the user until the activity begins. For example, the driver may be required to remain with the third party rider until baseball practice begins or until the third party rider's soccer game begins. Conventional systems fail to meet the needs of these third party riders because they fail to provide a driver who, for example, ensures the exemplary child is dropped off at the right field with his or her right team. The requirements of safety beyond present transport services are not present under available systems, meaning the "handholding" needed for these third party riders is simply not available.

Accordingly, a need exists for parents and guardians to book rides for third party riders. Moreover, a need for a technology based solution to provide third party riders with a driver from a trusted pool of drivers who also have the ability to pick up multiple users, such as siblings, and provide them transport to different locations exists. A further need exists for a trusted driver who is capable of providing multiple stops to serve the needs of multiple users.

There is a further need for these trusted drivers to provide repeatable and consistent rides weekly, even yearly. Finally, a need exists for a technological system and method to provision "handholding" services for third party riders.

SUMMARY

Disclosed herein is a method for scheduling a ride for a third party rider by a ride requestor. The method includes receiving, from a user device associated with the ride requester, a ride request for a third party rider. The method further includes identifying a set of trusted drivers from a pool of drivers and further identifying an optimal driver from the set of trusted drivers. The method may also include transmitting a ride confirmation to the ride requester, the optimal driver, and the third party rider.

Further disclosed herein is a system for scheduling a ride for a third party by a ride requester. The system includes a server device, including a processor, to receive, from a user device associated with the ride requester, a ride request for a third party rider. The server device further identifies a set of trusted drivers from a pool of drivers and further identifies an optimal driver from the set of trusted drivers. The server device may also transmit a ride confirmation to the ride requester, the optimal driver, and the third party rider.

Also disclosed is a non-transitory computer-readable medium containing instructions which, when executed by a processor, cause the processor to receive, from a user device associated with a ride requester, a ride request for a third party rider. The processor is further caused to identify a set of trusted drivers from a pool of drivers and identify an optimal driver from the set of trusted drivers. The processor may also be caused to transmit a ride confirmation to the ride requester, the optimal driver, and the third party rider.

BRIEF DESCRIPTION OF THE DRAWINGS

The accompanying drawings illustrate various embodiments of a transportation system for a transporting a vulnerable population.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate the techniques and embodiments may also be practiced in other similar devices.

Reference is now made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may alternatively be included in another embodiment or figure regardless of whether or not those elements are shown or described in another embodiment or figure. In other words, elements in the figures may be interchangeable between various embodiments disclosed herein, whether shown or not.

Figure 1:
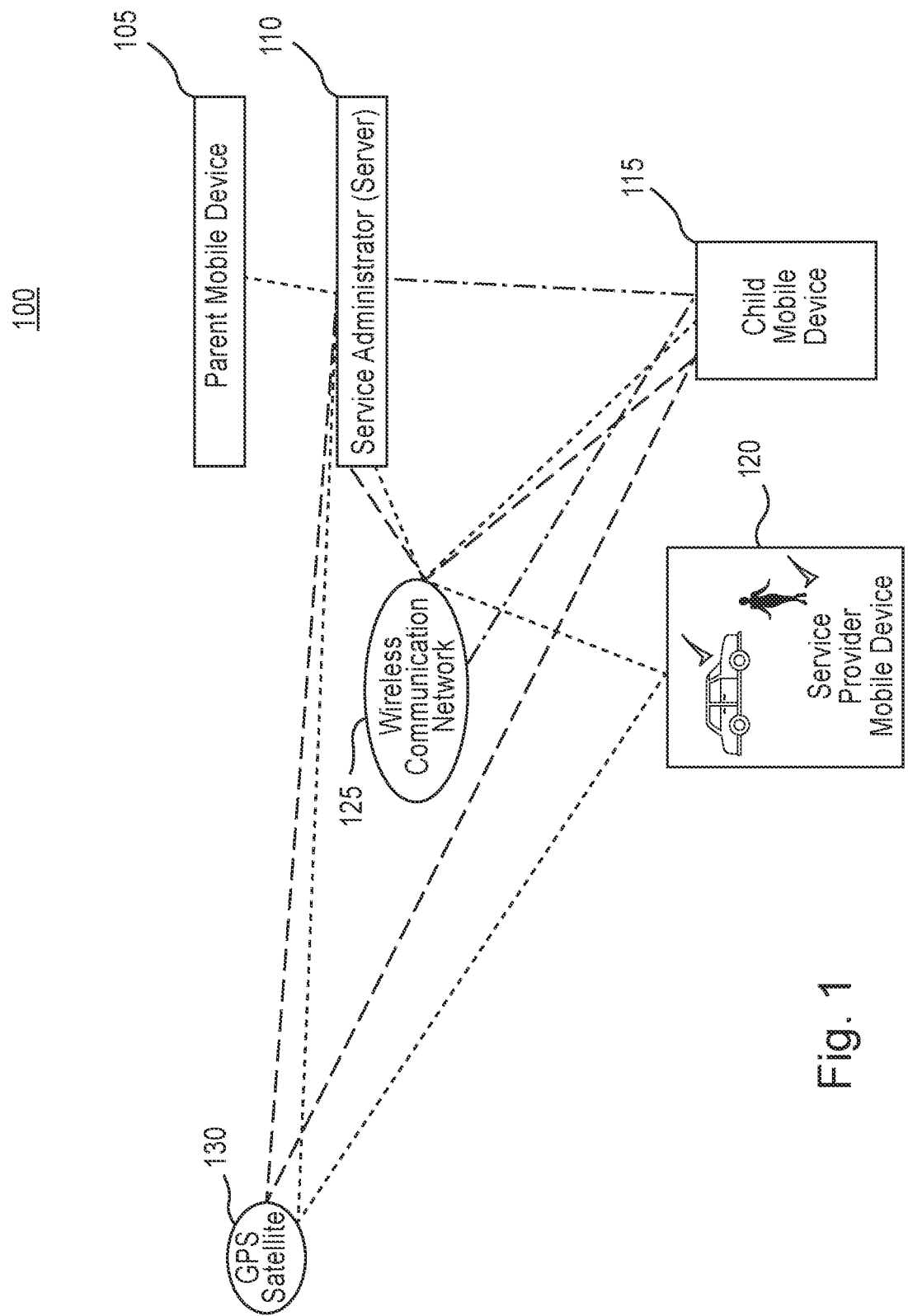
FIG. 1 illustrates an exemplary embodiment of a transportation system for transporting third party riders by a trusted set of drivers.

FIG. 1 illustrates an exemplary ride scheduling system 100, which includes a parent mobile device 105 connected to server 110, which is discussed in more detail below. Child mobile device 115 may connect to Server 110 via wireless communication network 125. Child mobile device 115 may also connect with a GPS Satellite 130, server 110, and a service provider mobile device 120, which may be associated with a driver.

Generally speaking, ride scheduling system 100 provides users with the ability to communicate from a parent mobile device 105 with a service provider mobile device 120, GPS Satellite 130 and a child mobile device 115. A user ride requestor may request a ride for a child associated with child mobile device 115 using parent mobile device 105 to access server 110. Server 110 may process the ride request from parent mobile device 105 and select a trusted driver from a set of trusted drivers associated with service provider mobile device 120. The process of selecting a trusted driver from a set of trusted drivers is discussed in greater detail below.

Examples of parent mobile device 105, child mobile device 115, and driver mobile device 120 include mobile phones, desktop computers, laptop computers, tablets, game consoles, personal computers, mobile devices, notebook computers, and any other digital device that has the processing ability to interact with the server 110. Parent mobile device 105 may further include the ability to pay for requested rides directly from parent mobile device 105 using conventional payment methods (e.g., credit cards, Paypal accounts, Bitcoin, Apple Pay, Net Pay, Direct Pay, and other similar payment methods). Child mobile device 115 may be implemented as a wearable device that implements less processing power than foregoing examples.

Parent mobile device 105, server 110 and service provider device 120 may include software and hardware modules that execute computer operations, communicate with wireless communication networks 125, GPS Satellite 130, and servers 110. Further, hardware components may include a combination of Central Processing Units ("CPUs"), buses, volatile and non-volatile memory devices, storage units, non-transitory computer-readable storage media, data processors, processing devices, control devices transmitters, receivers, antennas, transceivers, input devices, output devices, network interface devices, and other types of components that are apparent to those skilled in the art. These hardware components within parent mobile device 105, child mobile device 115, service provider mobile device 120, are used to connect with server 110.

A ride requester may be a legal guardian of a third party rider who has special care-taking responsibilities over the third party rider. Exemplary guardians may include a parent, legal guardian, coach, caretaker, administrator, grandparent, hospital or doctors' staff. Server 110 may send and receive information from child mobile device 115 to provide messages to a third party rider associated with child mobile device 115. In one embodiment, messages sent to the child mobile device may include spoken instructions that may be more accessible to a third party rider than a textual message. The spoken instructions may include information on how to interact with the child mobile device, a description of the driver coming to pick up the child, a picture or visual representation of the driver's vehicle, and an explanation of where the third party rider is going in the ride. In one embodiment, the spoken instructions may be spoken by the ride requestor in a manner that allows the third party rider to recognize and respond to the ride requestor's familiar voice. Child mobile device 115 will be discussed in further detail below.

Server 110 may provide web-based access to the parent mobile device 105, the service provider mobile device 120, and may transmit messages to child mobile device 115. The wireless communication network 125 may provide a user of parent mobile device 105 with access to server 110 or a child mobile device 115 or any other electronic device configured to receive communication from a user of parent mobile device 105. The server 110 may include cloud computers, super computers, mainframe computers, application servers, catalog servers, communications servers, computing servers, database servers, file servers, game servers, home servers, proxy servers, stand-alone servers, web servers, combinations of one or more of the foregoing examples, and any other computing device that may be used to execute web based access to ride scheduling system 100 by each of parent mobile device 105 and service provider mobile device 120. The one or more server computing devices 110 may include software and hardware modules, sequences of instructions, routines, data structures, display interfaces, and other types of structures that execute server computer operations. Further, hardware components may include a combination of Central Processing Units ("CPUs"), buses, volatile and non-volatile memory devices, storage units, non-transitory computer-readable storage media, data processors, processing devices, control devices transmitters, receivers, antennas, transceivers, input devices, output devices, network interface devices, and other types of components that are apparent to those skilled in the art. These hardware components within one or more server administrator may be used to execute the various methods or algorithms disclosed herein, and interface with parent mobile device 105, child mobile device 115, and service provider mobile device 120.

In one embodiment, parent mobile device 105, and service provider mobile device 120 may access server 110 by a wireless communication network 125. Server 110 may also access child mobile device 115 or may only transmit messages to child mobile device 115 depending on the capabilities of child device 115, as will be discussed below. In each case, wireless communication network 125 connects parent mobile device 105, child mobile device 115, and service provider mobile device 120 via an internet connection. Any suitable internet connection may be implemented for wireless communication network 125 including any wired, wireless, or cellular based connections. Examples of these various internet connections include implementations using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between parent mobile device 105, child mobile device 115, and service provider mobile device 115 and one of more servers 110.

GPS Satellite 130 may send GPS data to each of parent mobile device 105, child mobile device 115, and service provider mobile device 120 to identify a GPS position for a user ride requestor, a third party rider, and the driver, respectively. Each of parent mobile device 105, child mobile device 115, and service provider mobile device 120 may further communicate this information to server 110 in a manner that allows server 110 to monitor the locations of third party rider associated with child mobile device 115 and the driver associated with service provider mobile device 120.

Child mobile device 115 may be a handheld or a similar wireless device that is wearable by the child. Child mobile device 115 may be provided to a third party rider by a parent or a user ride requester or, alternatively, to a school. Child mobile device 115 may execute a program that may be installed on a handheld device selected from the list of user devices disclosed above, and/or a wearable device that allows the third party rider associated with child mobile device 115 to receive messages and ride information directly from server 110 or directly (or indirectly via server 110) from parent mobile device 105. Child mobile device 115 may display pictures and ride information details in a visual format (e.g., showing a picture of a color of car, license plate number, driver's license information, etc.) of the drivers and/or the drivers' cars and may be matched against each child scheduled to be picked up.

Child mobile device 115 may identify other third party riders at the same location who will be traveling with the third party rider in a group. Child mobile device 115 may further provide a status indication to the third party rider. Status indications that may be displayed may include statuses such as, but not limited to, "on-way," "arrived," "waiting," "dispatched," "not arrived," "waiting," "called," "dispatched," "reached," "absent", and "on-leave." Child mobile device 115 may further include a touch button phone allowing the third party rider to call parent mobile device 105 or service provider mobile device 120. Child mobile device 115 may also include a touch button to contact (i.e., call, text, email) another caretaker, such as a service administrator, customer care service provider, school staff, driver, or parent.

Figure 2:
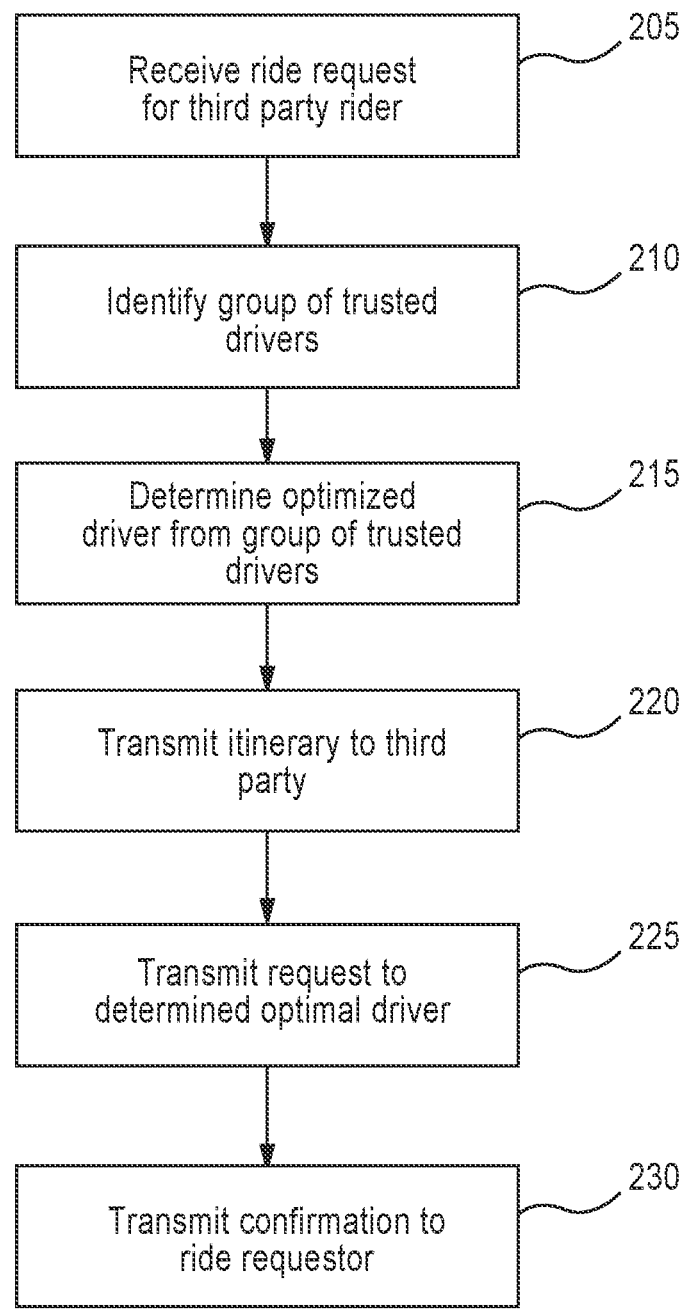
FIG. 2 illustrates a method of transporting users from the vulnerable population by a trusted set of drivers.

FIG. 2 illustrates a method 200 of transporting third party riders by a trusted driver selected from among a set of drivers. In this embodiment a ride request for a third party rider is received by a server, such as server 110 shown in FIG. 1, from a user device associated with the ride requestor, such as parent mobile device 105, also shown in FIG. 1. Based on this ride request, server 110 may identify a group of trusted drivers at step 210 using techniques and methods that will be further discussed below. Based on who is selected as being in the group of trusted drivers, a server (such as server 110 shown in FIG. 1) may select an optimal driver at step 215 based on a number of factors, including the schedule of the trusted driver, which drivers among the trusted drivers are "on duty," and other factors. The server, such as server 210 shown in FIG. 1, may then transmit an itinerary to a third party rider at step 220. The request may be transmitted to the optimal driver determined in step 215 at step 225. Finally, the server, in response to receiving a confirmation from the optimal driver or without receiving a confirmation from the optimal driver, may transmit a confirmation that the ride has been scheduled to the ride requestor by, for example, sending a message to parent mobile device 105, shown in FIG. 1 at step 230.

Figure 3:
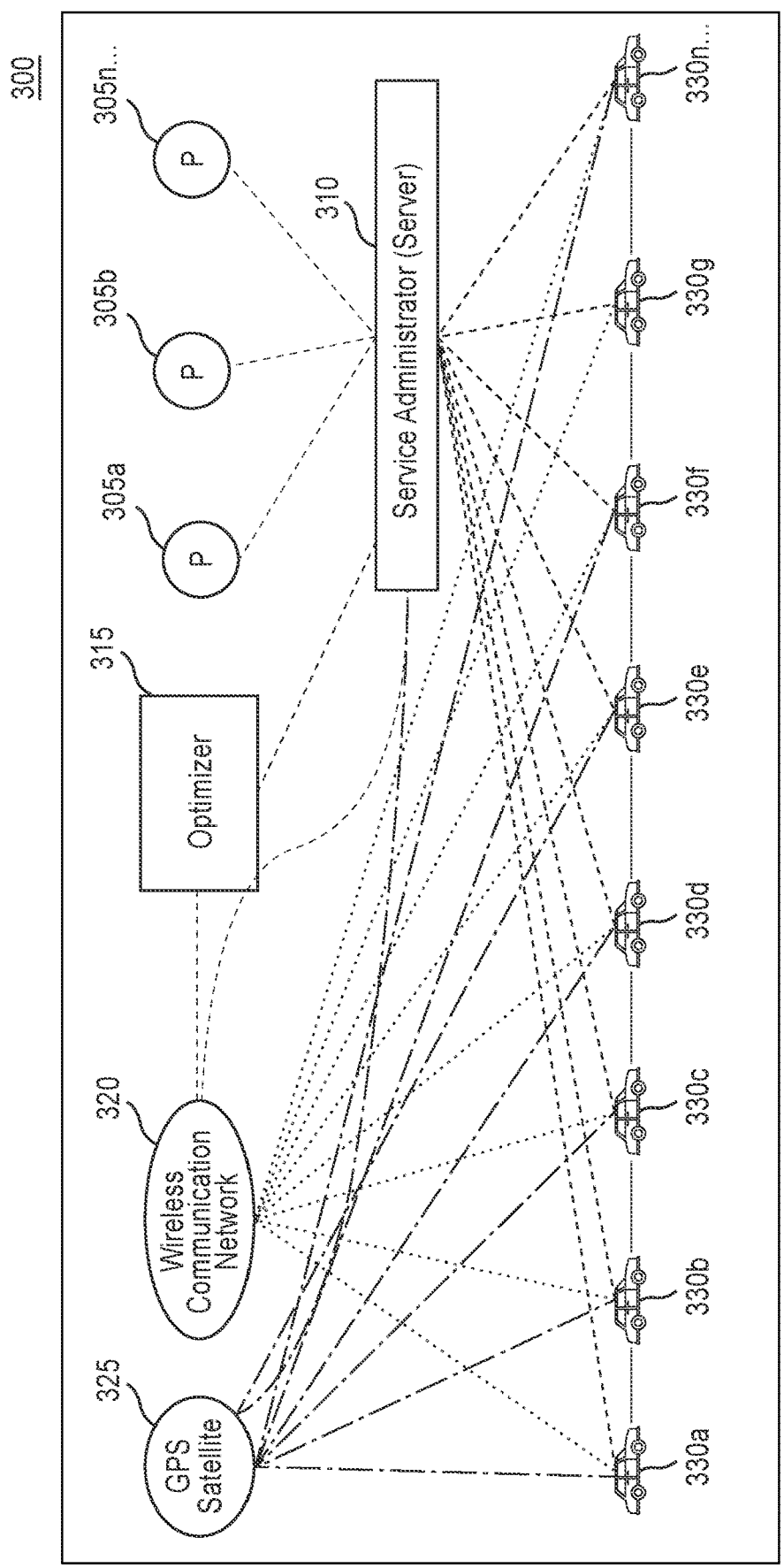
FIG. 3 illustrates yet another embodiment of the transportation system.

FIG. 3, illustrates yet another embodiment of the transportation system with multiple user ride requestors ("n" number user ride requestors) using multiple ("n" number devices) user devices, 305a, 305b, ... 305n to request rides for third party riders. Each of user devices 305a-305n may communicate with a server 310 in order to solicit a trusted driver at various locations in the general vicinity of the third party riders. Based on the requests received from user devices 305a-305n, server 310 interfaces with an optimizer 315 to pair an optimal trusted driver with one or more of the ride requests. Optimizer 315 may be implemented as a software module, software instructions, as a processor based algorithm, or may also be implemented as a computing device including a processor, hardware, and memory to select an optimal trusted driver for one or more ride requests.

Server 310, and optimizer 320 may be connected to wireless communication network 320, which is similar in implementation and description to wireless communication network 125 discussed above with respect to FIG. 1. GPS satellite 325 may also be similar in implementation and description to GPS satellite 130 shown in FIG. 1 and discussed above.

Ride requests transmitted from user devices 305a-305n, for the purposes of explanation, are scheduled such that a single driver may leave home at 330a and proceed to a first pickup point 330b, proceed to a first dropoff point 330c, proceed to a second pickup point 330d, proceed to a second dropoff point 330e, proceed to a third pickup point 330f, proceed to a third dropoff point 330g, and so on up until the driver returns home at point 330n ("n−1" number of pickups and dropoffs). As the driver proceeds from point to point, optimizer 315 may determine that this exemplary driver is more optimal for another request than a currently scheduled request and transmit a re-route request to server 310 to re-optimize the driver's schedule, provided the driver is within the trusted pool of drivers for that particular request, which will be discussed in further detail below. Based on the driver's location, a driver who may have been optimal at one point may not be the optimal driver for a ride when a new ride request is received. Optimizer 315 may further optimize the driver's route such that the last dropoff location 330(n−1) may optimize the distance from dropoff location 330(n−1) to the driver's home.

Figure 4:
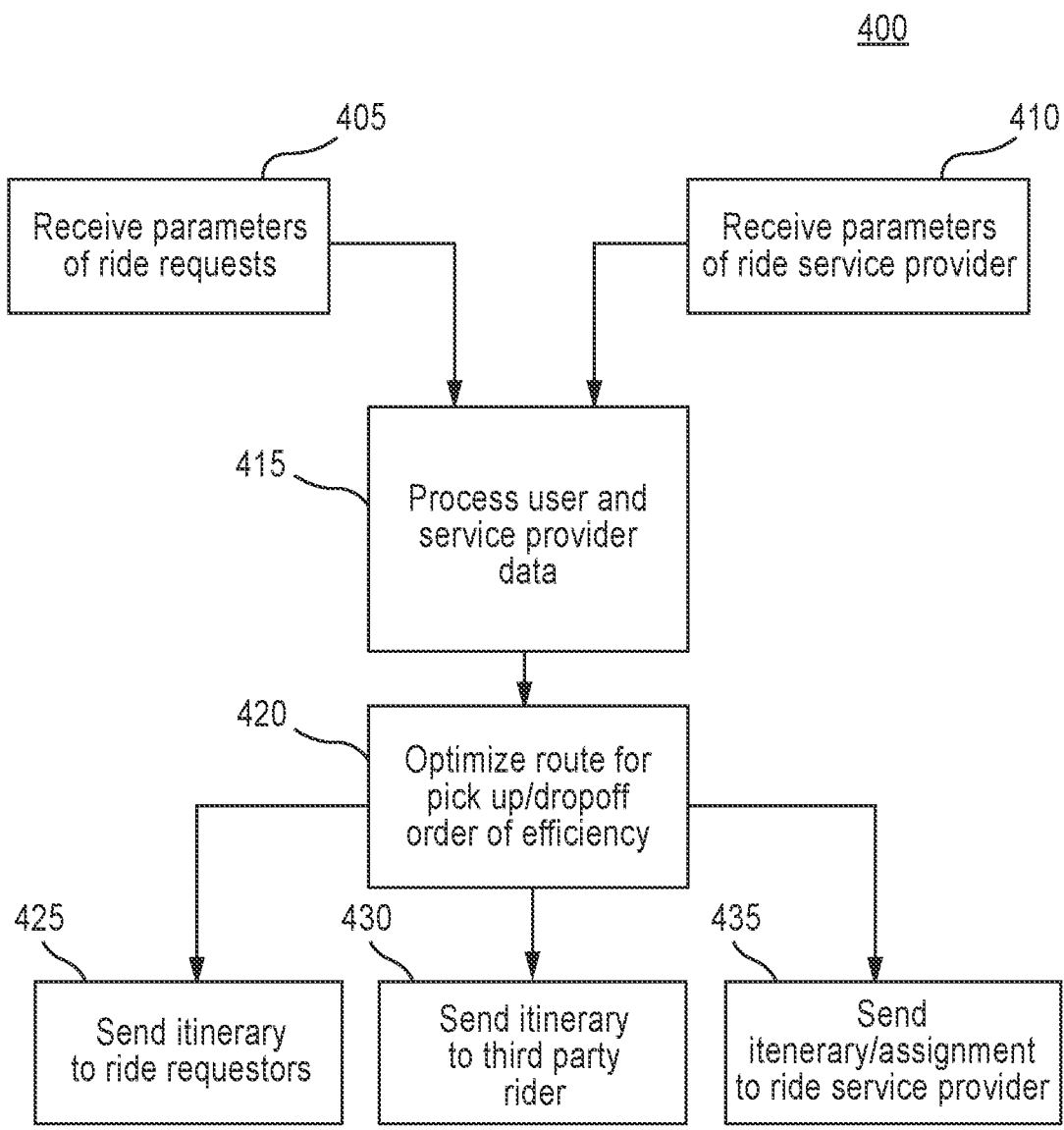
FIG. 4 illustrates a method for matching an optimal driver to a ride request.

FIG. 4 illustrates another embodiment of the system, which illustrates a method 400 for optimizing the efficiency and route for transporting third party riders by a trusted driver among a trusted set of drivers. In this embodiment a ride is requested by a ride requestor at step 405 using, for example, parent mobile device 105 shown and explained above with respect to FIG. 1 and parameters are transmitted to a ride service provider which may be provided by a server such as server 110, shown and explained above with respect to FIG. 1. Parameters of the ride request may include identification information about one or more third party riders, pickup time information, pickup location information, dropoff time information, dropoff location information, dropoff contact information, child interest information, and instructions for a driver.

At the same time, a ride service provider, such as a driver, may transmit the ride service provider's parameters for providing a ride at step 410 using, for example, service provider mobile device 120, shown and explained above with respect to FIG. 1. Parameters provided by the ride service provider may include information about the driver's shift schedule (i.e., the driver is willing to provide ride services between the hours of 8 a.m. and 12 p.m. on Monday, Wednesday, and Friday each week), information about the driver's current location, vehicle identification information (e.g., color of vehicle, license plate information, vehicle make, vehicle model, vehicle model year, etc.), the driver's driver license information, the driver's current schedule of pickups and dropoffs, and other information.

From there, server 110, for example, receives parameters of the ride requests transmitted by the user requestor at step 405 from parent mobile device 105 and the service provider parameters transmitted by the service provider at step 410 from 120 and processes the information at step 415. Server 110 may contain an optimizer, such as optimizer 315 shown and explained above with respect to FIG. 3, which optimizes a route at step 420 for pickup and dropoff efficiency for the ride service provider based on the information provided by the ride service provider in step 410 and given the parameters provided by the ride requestor at step 405. Server 110 may also recognize and schedule certain rides for certain third party riders based on the ride request parameters and based on which drivers, among the total pool of available drivers, constitute a set of trusted drivers and provision those drivers accordingly. Server 110 may further create a schedule for ride requests that require a trusted ride service provider (the driver) to travel the least distance.

Once server 110 has optimized the route for the driver at step 420, server 110 may send an itinerary to a ride requestor by transmitting the itinerary data to parent mobile device 105 at step 425. Similarly, server 110 may transmit itinerary for a scheduled ride to a third party rider by transmitting the itinerary data to child mobile device 115 at step 430. Finally, server 110 may further transmit itinerary/assignment information for the ride, including a schedule for each pickup and dropoff assigned to the ride service provider (the driver) by transmitting itinerary/assignment information to service provider mobile device 120.

Figure 5:
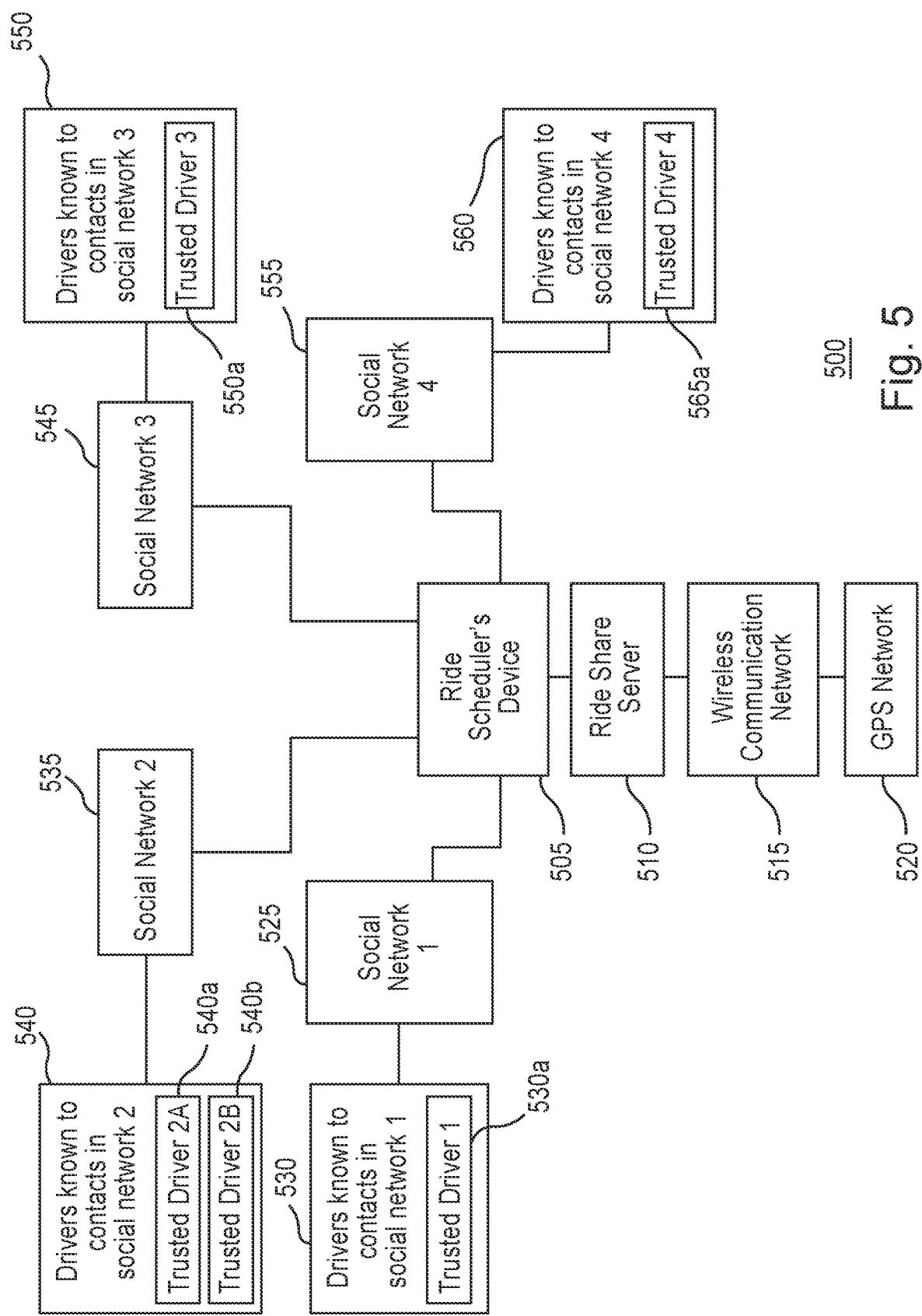
FIG. 5 illustrates a system for identifying a set of trusted drivers.

FIG. 5, illustrates system 500 for identifying a set of trusted drivers. System 500 includes a ride scheduler's device 505, which is similar in implementation and description to parent mobile device 105, shown in FIG. 1. Ride Scheduler device 505 may be connected to ride share server 510, which is similar in implementation and description to server 110, shown in FIG. 1 and server 310 shown in FIG. 3. System 500 may also include a wireless communication network 515 and a GPS network 520, which are similar in implementation and description to wireless communication network 125 shown in FIG. 1 and GPS satellite 130, also shown in FIG. 1, respectively.

System 500 interfaces with ride share server 510 to identify one or more social networks with which the ride scheduler is associated by ride scheduler's device 505. While four social networks (social network 1 525, social network 2, 535, social network 3 545, and social network 4 555) are shown in FIG. 5, any number of social networks may be implemented as part of system 500. In system 500 a list of contacts known to the ride scheduler via social network 1 525 is provided to ride share server 510 to identify those contacts who are both known to the ride scheduler and who are associated with a ride provision service. These drivers 530 who are identified as a contact of the ride scheduler in social network 1 525 and who are also identified as ride service providers are categorized by server 510 as trusted drivers. Accordingly, in the example shown in FIG. 5, trusted driver 1 530*a* is identified as a trusted driver because the trusted driver 1 is a contact of the user via social network 1 525 and is also a ride share service provider associated with a ride share service.

Similarly, in system 500, a list of contacts known to the ride scheduler via social network 2 535 is provided to ride share server 510 to identify those contacts known to the ride scheduler and who are associated with a ride provision service. These drivers 540 who are identified as a contact of the ride scheduler in social network 2 535 and who are also identified as ride service providers are categorized by server 510 as trusted drivers. Accordingly, in the example shown in FIG. 5, two trusted drivers, trusted driver 2A 540*a* and Trusted Driver 2B 540*b* are identified as trusted drivers because these trusted drivers are among contacts of the user via social network 2 535 and are also a ride share service provider associated with a ride share service.

Contacts known to the ride scheduler via social network 3 545 may also be provided to ride share server 510 to identify those contacts who are both known to the ride scheduler and who are associated with a ride provision service. These drivers 550 who are identified as a contact of the ride scheduler in social network 3 545 and who are also identified as ride service providers are categorized by server 510 as trusted drivers. Accordingly, in the example shown in FIG. 5, trusted driver 3 550*a* is identified as a trusted driver because trusted driver 3 550*a* is among the contacts of the ride scheduler via social network 3, 550 and is also a ride share provider associated with a ride share service.

Contacts known to the ride scheduler via social network 4 555 may also be provided to ride share server 510 to identify those contacts who are both known to the ride scheduler and who are associated with a ride provision service. These drivers 560 who are identified as a contact of the ride scheduler in social network 4 555 and who are also identified as ride service providers are categorized by server 565*a* as trusted drivers. Accordingly, in the example shown in FIG. 5, trusted driver 4 565*a* is identified as a trusted driver because trusted driver 4 565*a* is among the contacts of the ride scheduler via social network 4 560 and is also a ride share provider associated with a ride share service.

Figure 6:
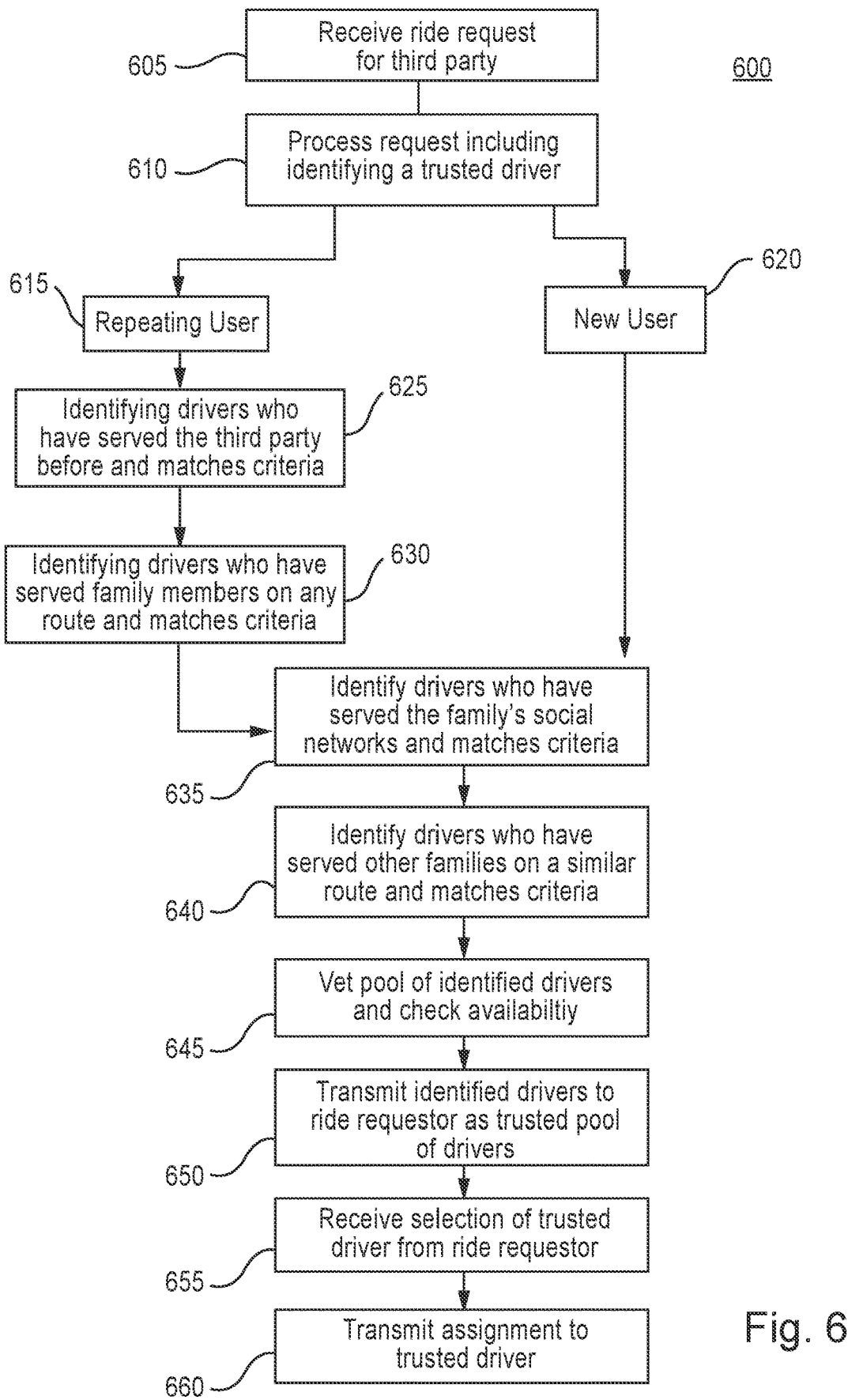
FIG. 6 illustrates a method for identifying an optimal driver.

FIG. 6 illustrates a method 600 for identifying an optimal driver. where a ride request for a third party is received at step 605 from, for example, a user device associated with a ride requestor, which may be similar in implementation and description to parent mobile device 105, shown in FIG. 1. In response to receiving the ride request from the user device, a server, such as server 110 shown in FIG. 1, processes the request and identifies a trusted driver at step 610. If the ride requestor previously requested a ride through a ride share service, the ride requestor may be considered a repeating user at step 615. If a ride requestor is identified as a repeating user at step 615, server 110 may identify, at step 625, drivers who have served a third party rider before on the same route and who also meet certain criteria, such as being "on duty" during the period of the ride request, not having conflicting rides previously scheduled, and other similar criteria.

In addition or alternatively, server 110 may also identify drivers who have served family members on any route and who match the foregoing exemplary criteria at step 630 as trusted drivers. Family members may include immediate family members (brothers and sisters, for example) or may include extended family members (grandparents, cousins, aunts, uncles, and etc.). Drivers who have served family members or who provided services on a similar route to the requested ride may be identified as a potentially trusted driver at step 630.

In the event the user ride requestor is a new user who has not previously requested a ride service for a third party rider through the ride provisioning service at step 620, method 600 skips steps 625 and 630 and proceeds directly to step 635. At step 635, regardless of whether or not the ride requestor is a repeating user or a new user, server 110 may identify drivers who served contacts known to the ride requestor's family through one or more social networks. Server 110 may access one or more social networks associated with the ride requestor's family by parent mobile device 105, for example. Alternatively, parent mobile device 105 may transmit information about contacts on one or more social networks to server 110 such that the server may identify drivers who have provided services to members of the family's social networks and who meet the ride request criteria, which may be similar to the parameters provided by the ride service provider at step 410 of method 400, as discussed above.

In addition, or alternatively, server 110 may obtain route information for the ride request at step 640 and, based on the route information, identify drivers who have served other families or other similar third party riders (similarity being a function of an age of the third party rider, the gender of the third party rider, and other information).

At step 545 the drivers identified in steps 625-640 may be vetted to determine which, if any, driver is more appropriate than another for a particular ride. For example, if the ride requestor requests a female driver, server 110 may attempt to schedule a female driver to meet the ride request. Server 110 may further eliminate identified drivers based on driver parameters at step 645. For example, an identified driver may be off duty at the time of a particular pickup request and may, therefore, not be available to meet the parameters of the ride request.

At step 650, the server may optionally assign one of the identified drivers as a trusted driver for a ride request. Alternatively, at step 650, server 110 may transmit a list of drivers identified in steps 625-645 of method 600 to a ride requestor via parent mobile device 105, for example, as a trusted pool of drivers. In this case, the ride requestor may select one of the identified drivers as a trusted driver at step 655 and transmit the selection to be received by server 110 via parent mobile device 105. Once the trusted driver is selected, server 110 may transmit a driving assignment to the trusted driver along with a driving itinerary for the ride service at step 660.

Specifically, the method 600 will work in a way that a ride requester can be matched with a trusted driver who previously served the ride requester, their families, and the ride requester's specific family members and/or is known by the ride requester's social networks (first, second and/or third degree connections on Google, Facebook, LinkedIn, Twitter, Instagram, etc.) That is, method 600 takes into account parameters for identifying trusted drivers. All trusted drivers who served a user or assisted with transportation to the user's family in past may be further considered by rank based on some or all of the following criteria: number of times served; dates on when served; ratings and feedback received from user and family members; number of times served on which route and which family member; service provider's rating and feedback of user ride requester and/or family members.

A list of trusted drivers may further be provided to the user ride requester. This list of service providers may be arranged in any priority order, such as being rated on the most matched to least matched based on availability. In some embodiments, the third party requester or user may select a most suitable driver for the task based on the foregoing parameters. This may be one service provider who serves the family or may include multiple service providers with an option for user to select a service provider. Essentially, parameters that improve matching capability, quality and efficiency between user and the trusted pool of drivers may be utilized and optimized by use of social networks and identifying those services who have previously served the user.

The foregoing description is presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A method for scheduling a ride for a third party rider by a ride requestor, comprising:
   receiving, by a server device including a processor and from a user device associated with the ride requestor, a ride request for a third party rider;
   determining, by the server device including a processor, a social network connection between the ride requestor and one or more drivers from a pool of drivers;
   identifying, by the server device including the processor and from the pool of drivers, a set of trusted drivers based on the social network connection between one or more drivers from the pool of drivers and the ride requestor;
   identifying, by the server device including a processor, a geographic location of the ride requestor and one or more of the one or more drivers among the set of trusted drivers;
   determining, by the server device including the processor, an optimal driver from among the set of trusted drivers, based on a geographical distance between the optimal driver and the ride requestor;
   transmitting, by the server device including the processor, a ride confirmation to the user device associated with the ride requestor, the optimal driver, and the third party rider;
   receiving, by the server device including the processor from the user device associated with the ride requestor, an audio instruction in a voice of the ride requestor spoken in a manner that allows the third party rider to recognize the voice to a device associated with the third party rider; and
   receiving, by the server device including the processor, a confirmation from the device associated with the third party rider upon recognition of the audio instruction.

2. The method of claim 1, wherein each driver in the set of trusted drivers is a contact of the ride requestor on a social media network.

3. The method of claim 1, wherein the optimal driver is identified from the set of trusted drivers based on information provided in the ride request.

4. The method of claim 1, wherein the optimal driver is identified from the set of trusted drivers based on one or more parameters provided by the optimal driver.

5. The method of claim 1, wherein the set of trusted drivers is identified based on having previously provided a driving service for the ride requestor.

6. The method of claim 1, wherein the user device is a mobile device.

7. The method of claim 1, wherein the ride confirmation includes identification information.

8. The method of claim 7, wherein the identification information includes a pictorial representation of the third party rider.

9. The method of claim 7, wherein identification information includes driver vehicle identification information.

10. The method of claim 1, further comprises, transmitting a real time status update of the ride to the ride requestor.

11. A system for scheduling a ride for a third party rider by a ride requestor, comprising:
    a server device, including a processor to:
      receive, from a user device associated with the ride requestor, a ride request for a third party rider;
      determine a social network connection between the ride requestor and one or more drivers from a pool of drivers;
      identify, from the pool of drivers, a set of trusted drivers based on the social network connection between one or more drivers from the pool of drivers and the ride requestor;
      identify a geographic location of the ride requestor and one or more of the one or more drivers among the set of trusted drivers;
      determine, from among the set of trusted drivers, an optimal driver based on a geographical distance between the optimal driver and the ride requestor;
      transmit a ride confirmation to the ride requestor, the optimal driver, and the third party rider;
      receive, from the user device associated with the ride requestor, an audio instruction in a voice of the ride requestor spoken in a manner that allows the third party rider to recognize the voice to a device associated with the third party rider; and
      receive, from the device associated with the third party rider, a confirmation upon recognition of the audio instruction.

12. The system of claim 11, wherein the optimal driver is identified from the set of trusted drivers based on information provided in the ride request.

13. The system of claim 11, wherein the optimal driver is identified from the set of trusted drivers based on one or more parameters provided by the optimal driver.

14. The system of claim 11, wherein the ride confirmation includes identification information.

15. The system of claim 14, wherein the identification information includes driver vehicle information.

16. A non-transitory computer-readable medium containing instructions which, when executed by a processor, cause the processor to:
    receive, from a user device associated with a ride requestor, a ride request for a third party rider;

determine a social network connection between the ride requestor and one or more drivers from a pool of drivers;

identify, from the pool of drivers, a set of trusted drivers based on the social network connection between one or more drivers from the pool of drivers and the ride requestor;

identify a geographic location of the ride requestor and one or more of the one or more drivers among the set of trusted drivers;

determine, from among the set of trusted drivers, an optimal driver based on a geographical distance between the optimal driver and the ride requestor;

transmit a ride confirmation to the ride requestor, the optimal driver, and the third party rider;

receive, from the user device associated with the ride requestor, an audio instruction in a voice of the ride requestor spoken in a manner that allows the third party rider to recognize the voice to a device associated with the third party rider; and receive, from the device associated with the third party rider, a confirmation upon recognition of the audio instruction.

17. The non-transitory computer-readable medium of claim 16, wherein the processor further transmits the ride confirmation to a device associated with the third party rider.

18. The non-transitory computer-readable medium of claim 16, wherein each driver in the set of trusted drivers is a contact of the ride requestor on a social media network.

19. The non-transitory computer-readable medium of claim 18, wherein the optimal driver is identified from the set of trusted drivers based on one or more parameters provided by the optimal driver.

20. The non-transitory computer-readable medium of claim 16, wherein the set of trusted drivers is identified based on having previously provided a driving service for the ride requestor.

* * * * *